(12) United States Patent
Fong et al.

(10) Patent No.: US 6,366,945 B1
(45) Date of Patent: *Apr. 2, 2002

(54) FLEXIBLE DYNAMIC PARTITIONING OF RESOURCES IN A CLUSTER COMPUTING ENVIRONMENT

(75) Inventors: Liana Liyow Fong, Irvington, NY (US); Ajei Sarat Gopal, Fort Lee, NJ (US); Nayeem Islam, Thornwood, NY (US); Andreas Leonidas Prodromidis, New York, NY (US); Mark Steven Squillante, Pound Ridge, NY (US)

(73) Assignee: IBM Corporation, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,454

(22) Filed: May 23, 1997

(51) Int. Cl.⁷ .................................................. G06F 9/00
(52) U.S. Cl. ...................................................... 709/104
(58) Field of Search ................................ 709/100, 107, 709/104, 105, 215, 102, 106, 103; 710/39, 56; 711/129, 130, 153, 173

(56) References Cited

U.S. PATENT DOCUMENTS

| 4,603,382 A | * | 7/1986 | Cole et al. .................. 364/200 |
| 5,230,065 A | * | 7/1993 | Curley et al. ............... 709/200 |
| 5,325,526 A | * | 6/1994 | Cameron et al. ........... 395/650 |
| 5,394,547 A | * | 2/1995 | Correnti ..................... 709/102 |
| 5,640,604 A | * | 6/1997 | Hirano ......................... 710/56 |
| 5,748,892 A | * | 5/1998 | Richardson ................. 709/200 |

* cited by examiner

Primary Examiner—Majid A. Banankhah

(57) ABSTRACT

The invention provides the mechanism, hereinafter referred to as Flexible Dynamic Partitioning (FDP), to allocate and reallocate resources among scheduling schemes of many types for multicomputing environments. Resources can include, but are not limited to, processors, disks and communications connections. Partitioning of resources can be initiated by both application and system triggers. Once dynamic partitioning is triggered, FDP allows a partition to invoke a set of resource allocation functions associated with its partition. The reallocation function performs a set of resource matchings and determine the necessary resource movement among partitions.

20 Claims, 10 Drawing Sheets

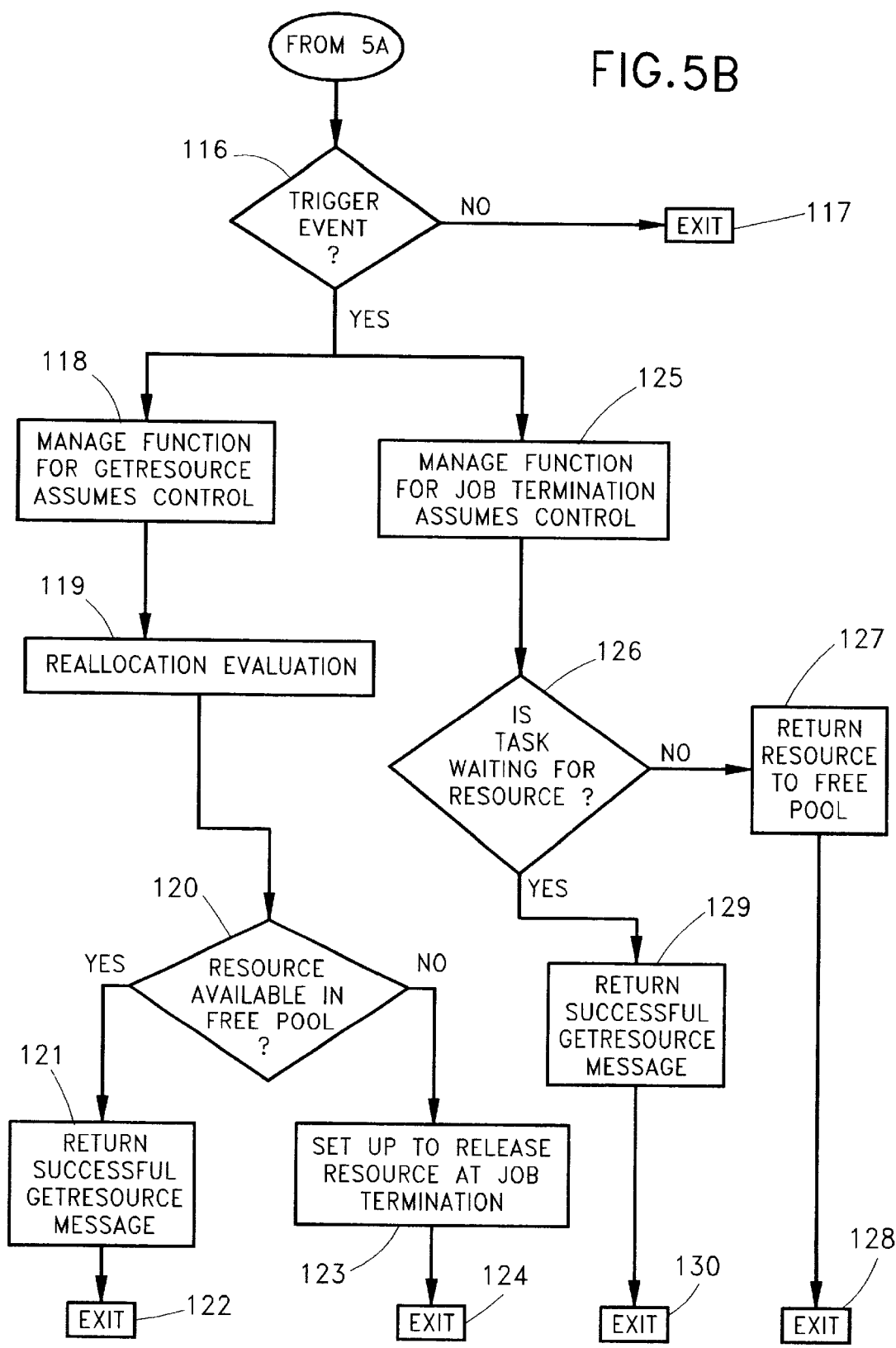

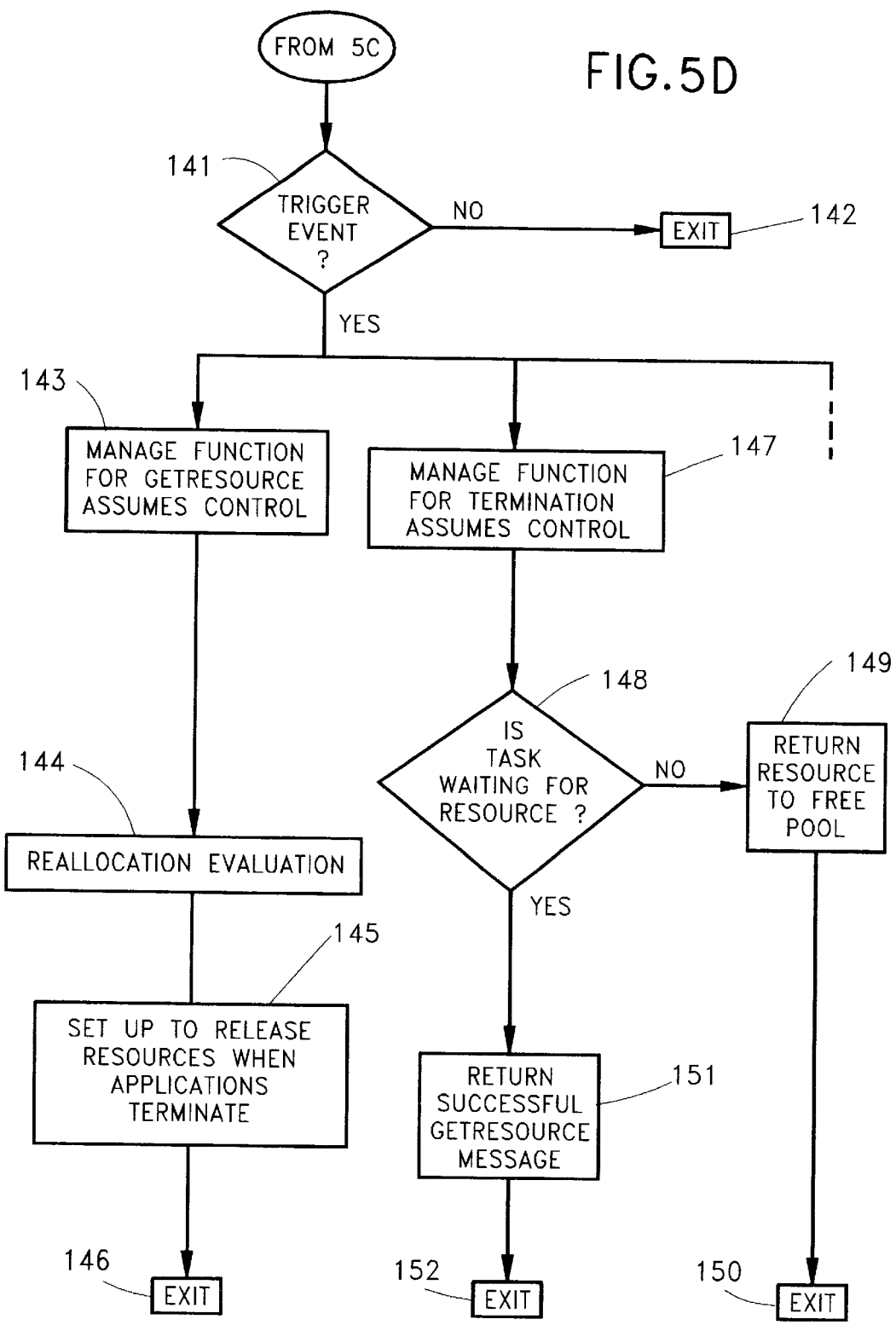

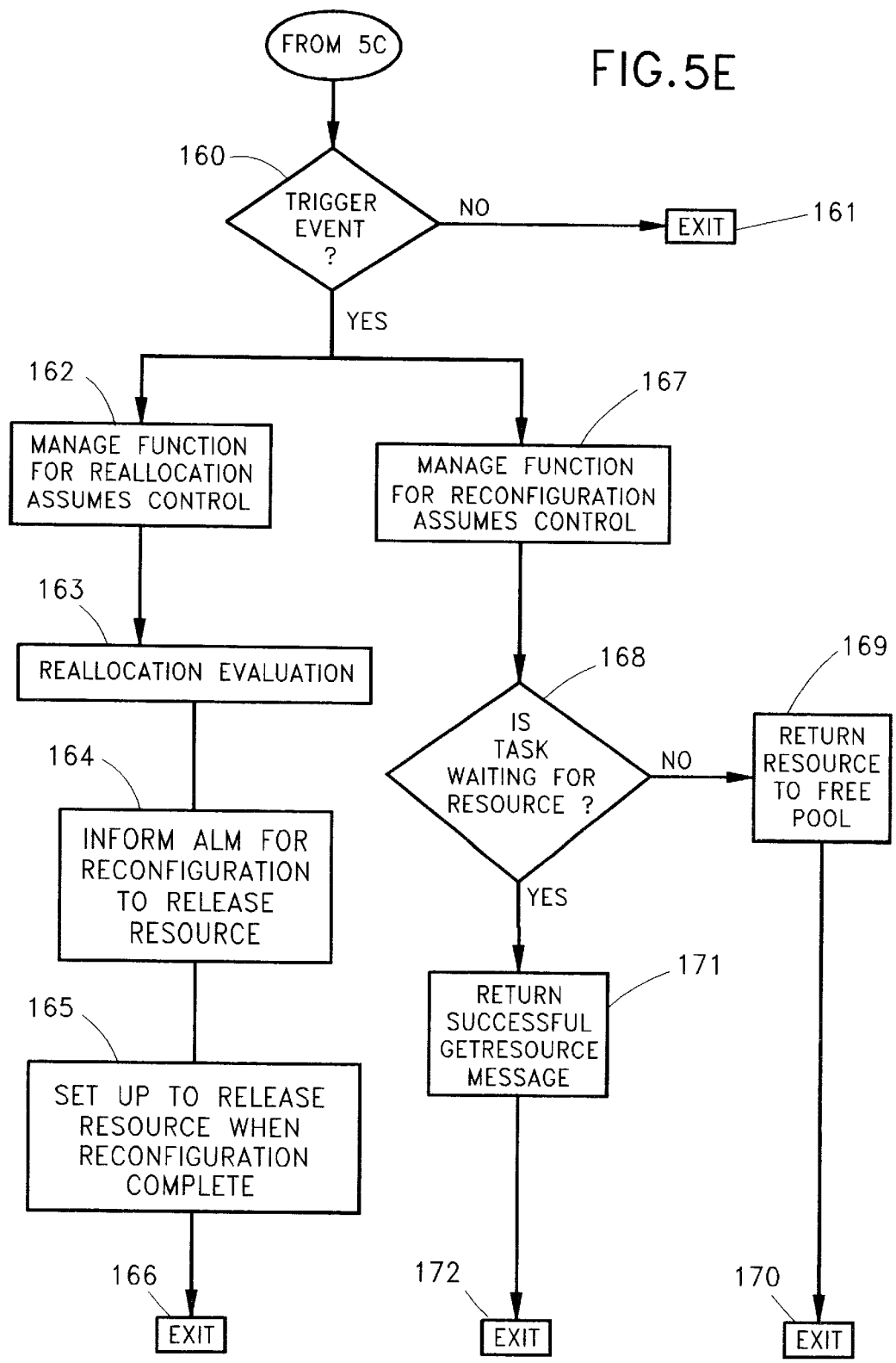

FLEXIBLE DYNAMIC PARTITIONING OF RESOURCES IN A CLUSTER COMPUTING ENVIRONMENT

FIELD OF THE INVENTION

This invention relates to partitioning of resources in a cluster computing environment. More specifically, it relates to dynamic allocation of resources in response to application and system triggers in a cluster computing environment wherein partitioning of resources is desirable or necessary to support a variety of applications and operating requirements.

BACKGROUND OF THE INVENTION

Allocation of computer resources to parallel-running tasks is a challenge for systems of all sizes. The parallel processing architecture involves the use of many interconnected processors to access large amounts of data. In a massively parallel processing system, as well as in a network of computers, a relatively large number of separate processing elements are interconnected to simultaneously process a large number of tasks at speeds far exceeding those of conventional computers. Though such computing environments are often composed of many nodes, the nodes are viewed and function as one single resource. The grouping of all nodes into a single resource creates advantages in increased capacity and speed. However, to perform parallel operations efficiently, it is desirable to have the capability of allocating the resources among different tasks as needed.

Carving out or allocating parts of the system to run tasks without interfering with each other is commonly referred to as "partitioning." Partitioning, in general, is the ability to divide up system resources into groups of parts in order to facilitate particular management functions. The structure of massively distributed parallel processing systems provides the opportunity to partition the system into groups of nodes for various purposes.

In the past, some partitioning schemes have been devised which partition a system into persistent, or static partitions. Persistent partitions are quasi-permanent groupings of resources which persist or survive failure or shutdown of the system. One implements a static or persistent partitioning scheme when the set of potential applications to be executed on the system is not highly variable, so that resources can be dedicated to those applications. In the state of the art of parallel processing and computer networking, however, it is unrealistic in many instances to assume that any system will only be required to run a pre-set number of applications and that static partitioning can be maintained over the lifetime of the system. Moreover, the capabilities of the parallel computing systems and computer networks would be underutilized if only a fixed number of applications were to be run on dedicated resources. One looks to parallel processing systems and computer networks to provide the flexibility to run a myriad of parallel scientific and/or commercial applications as needed.

The resource requirements for each parallel scientific or commercial application may be vastly different from each other. Furthermore, the communication and synchronization traits among the constituent tasks of different parallel applications can be equally diverse, from the one extreme, consisting of fine-grained tasks that require frequent communication and synchronization among tasks within an application, to the other extreme, comprising coarse-grained tasks which operate independently. Therefore, parallel computers, such as the IBM RISC System/6000 Scalable Power Parallel System 2 (hereinafter SP2), must support a wide variety of parallel applications, each with its own unique resource requirements. As a specific example, the interaction, synchronization, and communication among threads within fine-grained applications typically require the simultaneous allocation of their threads on computing nodes; whereas, the independent tasks of coarse-grained applications do not require simultaneous resource allocation. Both types of applications are scheduled (i.e., allocated) based upon system status and application characteristics, such as the number of tasks to be performed for the application, the execution time, required disk space, etc.

In order to perform efficient scheduling of resources, several scheduling methods have been devised for parallel scheduling of applications. The first is a "space sharing" scheduling method under which the nodes are partitioned among different parallel jobs. Several space sharing strategies have been proposed in the past. The aforementioned static partitioning of nodes has been utilized in production systems, given the low system overhead and simplicity from both the system and application perspectives. Static space sharing of nodes can lead to low system throughputs and resource utilization under nonuniform workloads. System performance can be further improved by adaptively determining the number of nodes allocated to a job based on the system state when the job arrives using adaptive partitioning. The performance benefits of adaptive space sharing are somewhat limited and it generally cannot respond to subsequent workload changes. Another scheme, so-called space sharing with dynamic partitioning, will partition and repartition resources upon all entries and exits of applications as well as throughout their execution. This scheme can maintain very efficient resource utilizations. However, if the frequency of repartitions is not controlled, the associated overhead can limit, and even eliminate, the potential benefits.

Another scheduling scheme is "time sharing" wherein the nodes are rotated among a set of jobs, which ensures that all jobs gain access to the system resources within a relatively short period of time. Time sharing can be effective for tasks with small processing requirements, but may not be particularly suitable for applications with large data sets. Researchers have recognized the benefits of attempting to combine space and time sharing scheduling methods, in a so-called gang scheduling system.

Yet another scheduling methodology, for scheduling coarse-grained and sequential applications, is "load sharing" which attempts to balance the load among the nodes and thereby reduce mean response time. As previously noted, coarse-grained applications require less interaction and synchronization than do fine-grained applications, so that the nodes operate independently once the application tasks have been assigned.

All of the foregoing scheduling policies have their advantages and disadvantages. It is generally agreed that there is no single scheduling scheme that is best for all application requirements. A modern parallel system should be able to support many different scheduling schemes simultaneously, one for each different class of application. The resource management system should be able to partition the available resources across the different scheduling schemes in a way that meets system objectives, including, but not limited to, maximizing all resource utilization, providing the best overall mean response time, and providing the optimal system throughput. In addition, the resource management system should be able to monitor the state of the system and dynamically and efficiently adjust the resources allocated to the different partitions in response to changes in the workload and changes in the demands on the resources.

What is desirable is an allocation method which supports multiple scheduling schemes and provides for management of schedulable resources across scheduling partitions.

It is additionally desirable that the allocation method be applicable to all computer environments, including shared-memory and distributed-memory systems, scientific and commercial workload environments, and loosely-coupled and tightly-coupled parallel architectures.

SUMMARY OF THE INVENTION

The invention provides a resource management mechanism, hereinafter referred to as Flexible Dynamic Partitioning (FDP), to allocate and reallocate resources among scheduling schemes of many types for the multi-computing environments. Resources can include, but are not limited to, processors, disks and communications connections. Partitioning of resources can be initiated by both application and system triggers, which are system administrator and/or user-defined. Examples of application triggers are application entries/exits or resource demand changes. Examples of system triggers include timers, resource utilization differential functions, and faults. Once dynamic partitioning is triggered, FDP allows a partition to invoke a set of resource allocation functions associated with its partition. The reallocation function, which is user-defined or defined by the system administrator, may perform a set of resource matchings and determine the necessary resource movement among partitions. The reallocation function can be a generalized function applicable to all scheduling partitions, or a unique function for each group of partitions.

BRIEF DESCRIPTION OF THE DRAWINGS

The invention will now be described in further detail with specific reference to the accompanying figures wherein:

FIGS. 5A through 5E provide a representative FDP process flow for the system hierarchy illustrated in FIG. 4.

DESCRIPTION OF THE PREFERRED EMBODIMENT

Given the wide variety of parallel scientific and commercial applications, each with different resource requirements, together with the fact that each of the different scheduling schemes provides the best performance for different subsets of these diverse application requirements, the resource management system for general-purpose parallel computers and computer networks must support multiple logical partitions using different scheduling schemes. The allocation and reallocation of resources among the local partitions must be effective and efficient, with no optimal reallocation function currently available to meet all requirements. For these reasons, Flexible Dynamic Partitioning (hereinafter, FDP) has been invented to support the dynamic re-allocation of resources among partitions and subpartitions which may use different scheduling schemes. FDP facilitates the reduction of overhead previously associated with dynamic partitioning in large-scale parallel environments by using a minimum time interval and/or a minimum number of applications awaiting resources as system triggers, to limit the number of re-allocations, thus decreasing the total cost of repartitioning by batching multiple re-allocation demands together.

FDP is the means and methods for determining the number of partitions and for controlling the management of partitions in a system which requires repartitioning of nodes and reallocations of resources among partitions. FDP allows a partition to invoke the manage function on its peer or subpartition and enforces a minimum time to invoke the function.

Figure 1:
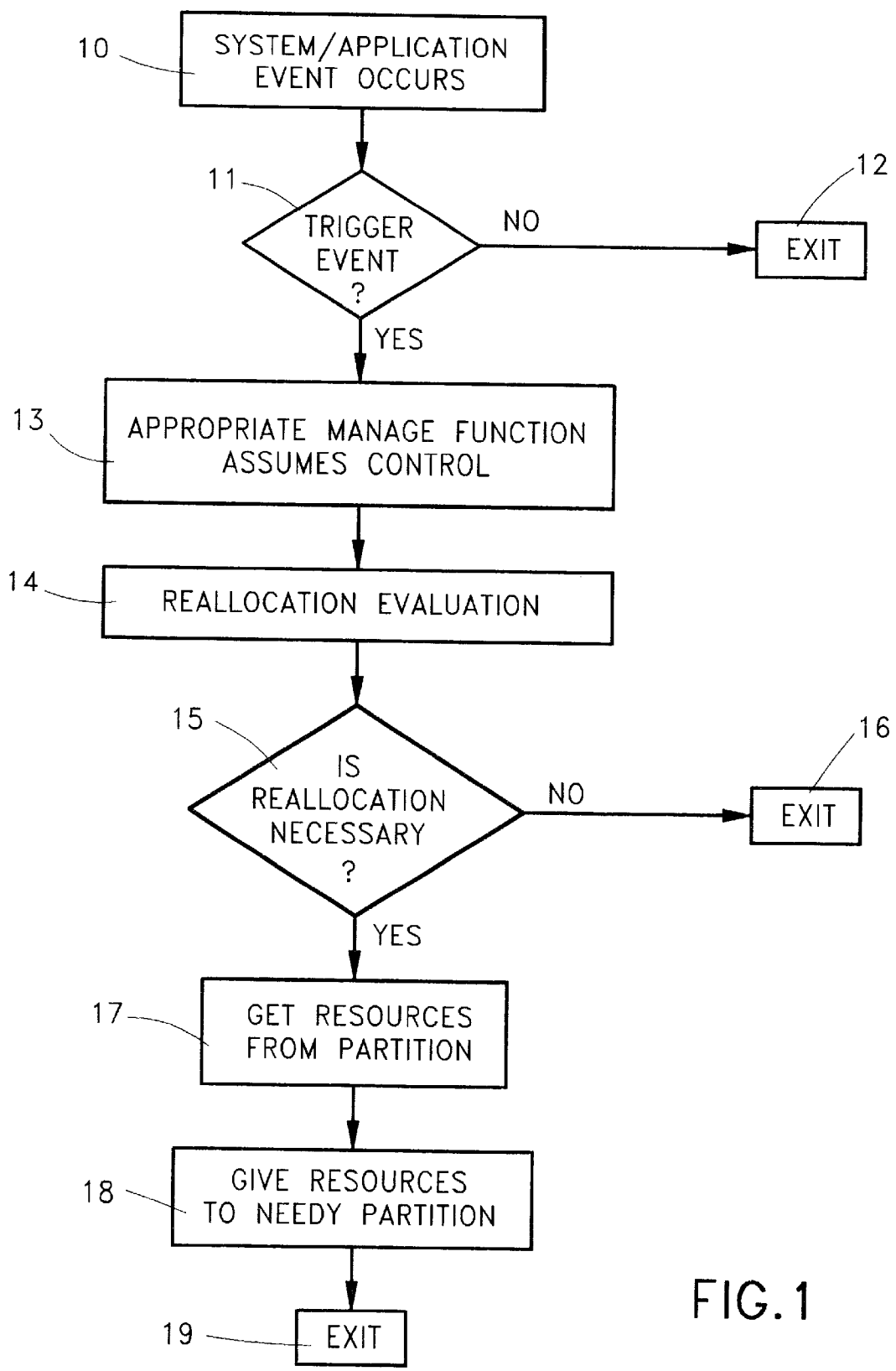
FIG. 1 depicts a representative flow chart of the logic of Flexible Dynamic Partitioning.

FIG. 1 is a logic flow of the FDP mechanism. System or application events occur at step 10, and the events are evaluated at step 11. The evaluation at step 11 is conducted to determine if the application or system events are trigger events as defined by the user or system administrator. Application triggers may be application entries/exits or resource demand changes; while system triggers can include timers, resource utilization differential functions, and faults. The yes/no determination at decision box 11 can result from any combination of logical operations on the triggers.

If the event is not one defined for FDP, the system exits at 12. Upon detection of an FDP trigger, i.e. a "yes" response at 11, the appropriate manage function is invoked and given control of the response to the trigger event, at step 13. In step 14 the manage function conducts a reallocation evaluation, mapping the requests to the potential resources, consulting system status data, and applying user-defined reallocation functions. Examples of user-defined, or system administrator-defined, reallocation functions, which can be common or unique to partitions, include the following: a common reallocation moves nodes from an under-utilized partition to a partition which is over-utilized based upon an assessment of the load differential; or a unique reallocation function reallocates nodes with a specific memory size from one partition to another.

After conducting a reallocation evaluation, the manage function makes a determination as to whether reallocation is necessary, at decision box 15. If reallocation is not necessary or appropriate given the evaluation results, the system exits at 16. If, however, reallocation is necessary, the manage function gets resources from one set of partitions, at step 17, and gives those resources to the designated set of "needy" partitions, at step 18. After the resources have been allocated in this manner, the system exits at 19. It is to be noted that in a hierarchical structure, the process flow of FIG. 1 will be repeated for each succeeding level of partitions and subpartitions until the resources have been allocated sufficiently to generate a "no" determination at the decision box which determines whether reallocation is necessary.

Figure 2:
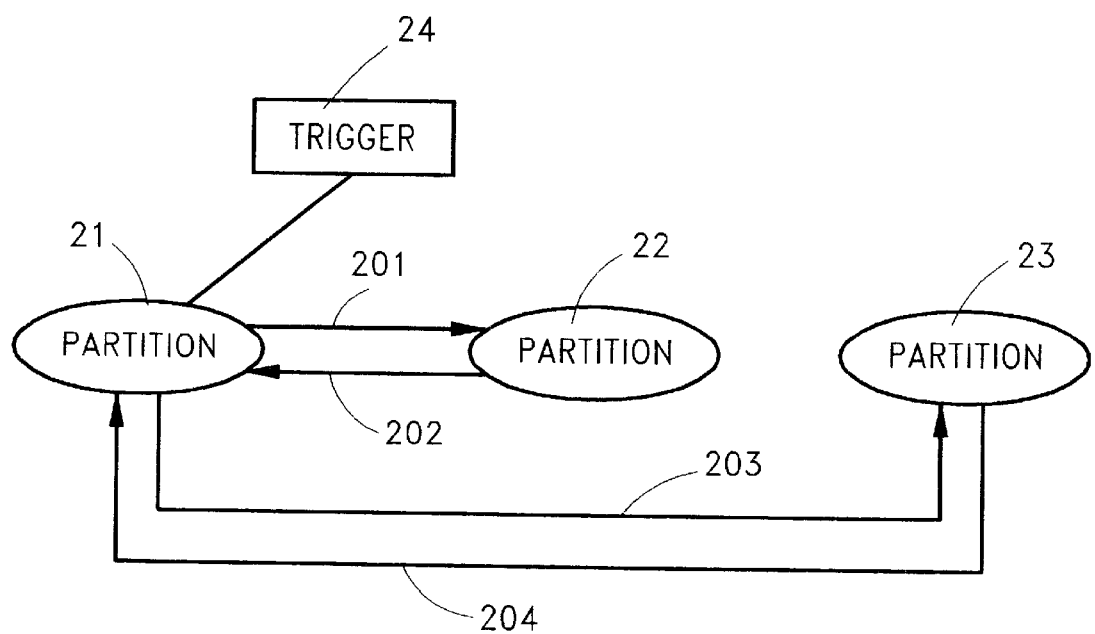
FIG. 2 schematically illustrates a logical relation of peer partitions when at least one trigger necessitates reallocation.

FIG. 2 shows one possible way that FDP can be used to support a logical relationship among multiple peer partitions and the other FDP functions conducted among the partitions in response to triggering events. A triggering event 24 occurs which affects the resources of partition 21. An example of such a trigger may be that the load utilization of resources in partition 21 has reached its threshold. Another example of a trigger is the circumstance in which the number of applications awaiting resources in a partition exceeds the number of applications for the peer partition by at least a threshold amount. Under such conditions, partition 21 must seek help from a peer partition to share resources. Therefore, partition 21 communicates its need to partition 22 and, as indicated by lines 201 and 202, reallocation negotiations commence. Partition 21 may alternatively contact partition 23, as indicated by lines 203 and 204, or may even conduct the two FDP negotiations simultaneously in order to obtain the needed resources from one or both of its peer partitions.

Figure 3:
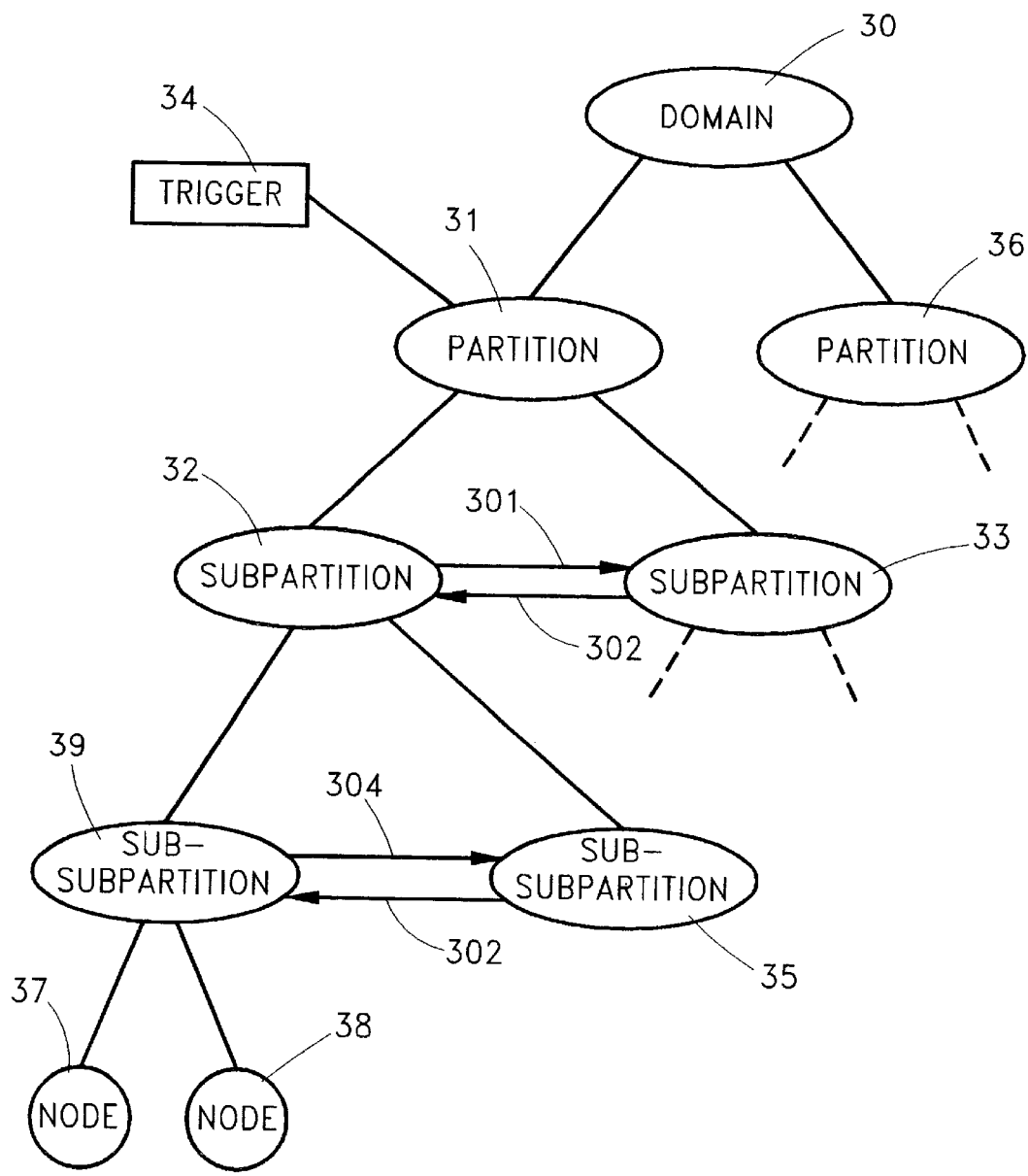
FIG. 3 schematically illustrates a hierarchical relation of partitions with associated triggers and reallocation functions.

FIG. 3 shows one possible hierarchical arrangement of multiple partitions and their associated FDP. The hierarchical scheduling framework makes it possible to incorporate a variety of different scheduling schemes into the system to maximize efficient utilization of a myriad of applications. The top level of the scheduler hierarchy consists of one or more domains into which the system administrator (not shown) divides the system resources to be managed independently. The computing nodes, 30, of each domain, where each node represents a unit of resources, are then divided into multiple independent partitions, 31 and 36. The nodes of each partition can be further divided into a number of non-overlapping subpartitions, 32 and 33 as shown for partition 31, depending upon the policies associated with the partition. These subpartitions may be recursively refined into smaller, disjoint subpartitions with the bottom level of the hierarchy consisting of single-node partitions, 37 and 38.

Each domain or top level partition is controlled by a distributed subsystem responsible for managing and allocating the set of resources at the top level partition, which subsystem is provided with an FDP manage function. The top level manage function maintains a list of all of the computing nodes within its control and the scheduling scheme supported by each of the partitions under its control. Each top level manage function also defines and dynamically adjusts the size of its partitions under the constraints specified by the system administrator. The top level manage function applies the FDP as a special reallocation function to determine when and how nodes are moved among the partitions of the domain to achieve the level of performance specified by the system administrator. The top level manage function uses the FDP mechanism to maintain the sizes of its partitions within the specified range so that the reallocation function is continuously satisfied. The repartitioning of resources among the partitions occurs dynamically as the top level manage function periodically re-evaluates the state of the system and the FDP reallocation function.

Each partition, 31 and 36, is controlled by a partition level subsystem, much like the top level subsystem that manages all of the resources in the partition, according to the particular scheduling scheme associated with the partition. At the partition level, the manage function provides mapping of all jobs it receives from the higher level scheduler to a lower level scheduler within its partition; management of subpartitions dynamically according to their state; and coordination among its subpartitions to implement the scheduling scheme associated with the partition. The FDP is used by each partition level manage function to manage its subpartitions 32 and 33 in a manner similar to the way the top level manage function uses this mechanism to manage its partitions, in response to triggers from the higher level partition as well as triggers detected at the subpartition level. Any repartitioning decisions percolate down the hierarchy at some adjustable intervals. The coordination of subpartitions by the partition level manage function depends upon the scheduling scheme being employed. Sub-subpartitions 39 and 35, which are subpartitions of subpartition 32, would each also have a subpartition level manage function for implementing the above-listed partition level functions on their associated nodes. At the node level, each node is responsible for running the processes of an application on its node by allocating the node-level system resources to the active processes assigned to it by the parent partition.

Note that the reallocation function can be a common one and may propagate up or down the hierarchy. In response to trigger 34, partition 31 applies FDP to conduct resource allocation negotiations, indicated by 301 and 302, between subpartitions 32 and 33. Since subpartition 32 is able to allocate among its own sub-subpartitions, 39 and 35, it applies FDP to conduct resource allocation negotiations, shown at 304 and 305, between its subpartitions. Finally, sub-subpartition 39 allocates its workload between its associated nodes 37 and 38.

Figure 4:
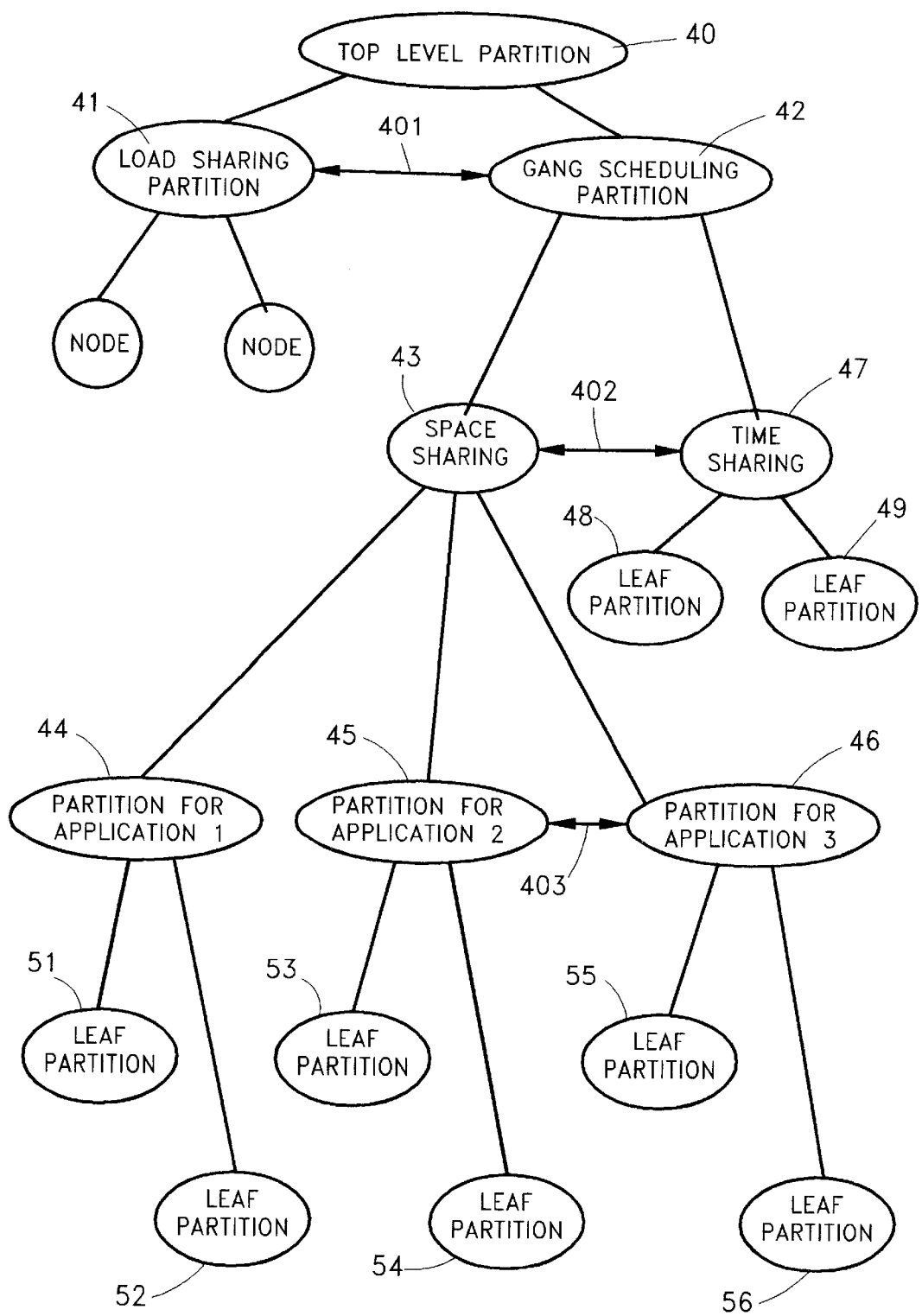
FIG. 4 shows a detailed relationship of multiple level hierarchical partitions with associated triggers and reallocation functions.

In FIG. 4 we describe how the FDP is preferably implemented to manage the reallocation of resources among partitions of different levels and of various scheduling paradigms. The Top Level Partition 40 uses its own FDP, depicted at 401, to allocate the resources between two partitions, 41 and 42, which use different scheduling schemes. For example, on the Top Level Partition, the implementation of the FDP may use the load differential between the load sharing and gang scheduling partitions to re-allocate nodes. When the differential exceeds a threshold, the Top Level Partition reacts and transfers nodes from one partition to the other to balance the load according to the values of these control parameters. Once it decides to repartition, it starts moving nodes between the gang scheduling partition and the load sharing partition until the differential drops below the threshold.

Repartitioning cannot occur more often than the time specified as one of the system triggers. The time interval is referred to herein as the smoothing time. This mechanism prevents moving nodes back and forth between two partitions in a thrashing manner and is applied as part of the reallocation evaluation determination at the top level of the partitioning hierarchy.

Each partition of the shown scheduling methodologies has it own FDP support functions for both controlling the resources granted to that partition and for performing any reconfigurations. Specifically, in a space sharing partition, 43, in which applications can be reconfigurable, the FDP 403 reallocates the resources to application partitions, 44–46, every time a job arrives or leaves. In this case, the reallocation triggers are job arrivals and departures, and the smoothing interval. The application partitions will, in turn, allocate their tasks among their associated leaf partitions, 51–56. Time sharing partition 47 will also utilize the FDP to determine the number and sizes of subpartitions in order to allocate its tasks between its leaf partitions, such as 48 and 49. It is to be noted that the number of leaf partitions may be greater than two, without affecting the implementation of the present invention.

FIGS. 5A through 5E provide a representative process flow illustrating how FDP would be applied in the hierarchical system which is depicted in FIG. 4. It is to be noted that the FDP process flow will be modified in accordance with the system architecture and that the inventors do not wish to be limited to the particular embodiments provided herein for purposes of description and illustration.

Figure 5A:
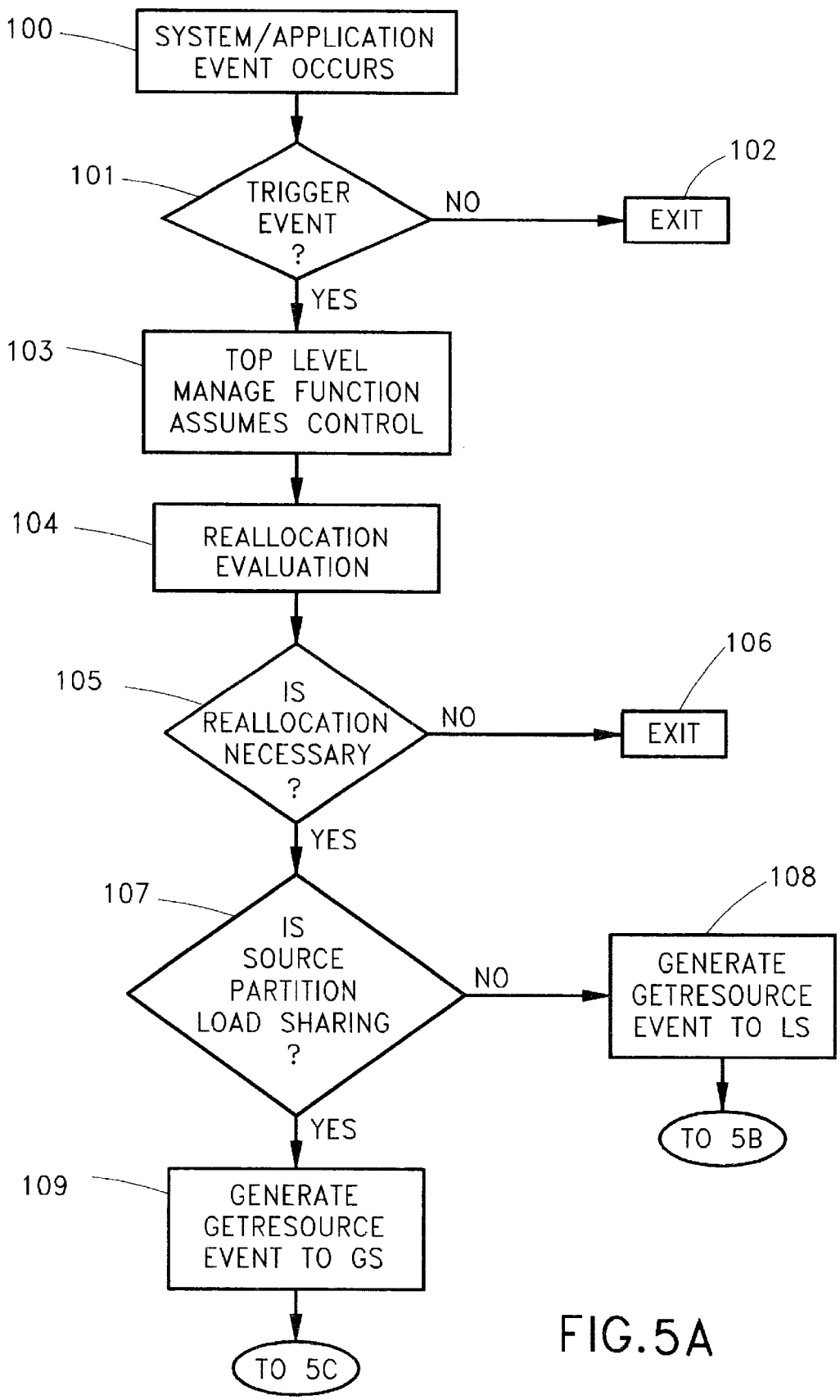

In FIG. 5A, the process flow commences when an event occurs at step 100. If the event does not constitute a user-defined system or application trigger, as determined at decision box 101, the process terminates at 102. If, however, the event is a trigger event, the top level manage function commences the FDP process at step 103. The top level manage function performs a reallocation evaluation at box 104, including ascertaining whether the minimum time interval has expired, and evaluating the load differential (or applying another appropriate reallocation function) among its partitions.

After the reallocation evaluation, if the determination at decision box 105 is that no reallocation is necessary, the system exits at step 106. If, however, reallocation is necessary, the top level manage function next determines whether the source partition is a load sharing partition. If the source partition is a load sharing partition, then at step 108 the top level manage function generates a command (illustratively termed a "getResource" command) to the load sharing scheduling partition to implement the specific functions to support the FDP, which continues in FIG. 5B as further discussed below. If the source partition is not a load sharing partition, and is a gang scheduling partition, the top level manage function instead generates a command, at step 109, (again shown as a "getResource" command) to the gang scheduling partition to implement the specific functions to support the FDP, as detailed with reference to FIG. 5C below.

In FIG. 5B, the load sharing partition, 41 of FIG. 4, determines, at step 116, whether the event it perceived is a triggering event. If not, the system exits at 117. If, however, the event is a triggering event, such as a command from the top level partition to perform a reallocation, the load sharing partition continues with the illustrated process flow. Depending upon the nature of the triggering event, the load sharing will invoke its manage function to perform one of several process flows; the illustrated examples being in response to a "getResource" command for allocating resources or to a "jobTermination" trigger for releasing and reallocating resources.

In response to a "getResource" request/command, the manage function is invoked at 118 and a reallocation evaluation performed at 119. The reallocation evaluation performed by the load sharing partition may include monitoring the status of the pool of its available sub-partitions and the current partition utilization. If the requested resource is available in the free pool, as determined at step 120, the load sharing partition returns a message to the top level partition that the reallocation is successful at 121 and exits at 122. The return message can contain both the "success" status and a list of resources available to be allocated by top level partition. If no resource is currently available, as determined at 120, then the load sharing partition directs at step 123 that the next available resource be released as soon as one or more jobs are terminated, and then exits at 124.

An alternative process flow is depicted at 125–130 in response to a job termination trigger. The load sharing partition invokes its manage function for job termination at step 125, and next determines if it can release the resource or if there is an outstanding resource request waiting to be filled, at decision box 126. If the resource can be used by a waiting requester, the load sharing partition returns a message to the top level partition that the reallocation is successful at 129 and exits at 130. If there is no current need for the resource, the load sharing partition returns the resource to the pool of free partitions, at 127 and exits at 128. As will be apparent to one having skill in the art upon reading this description, the system may additionally respond to other triggers, indicated by the third arrow to the right in the Figure, with the process flow paralleling the previously-detailed flow.

Figure 5C:
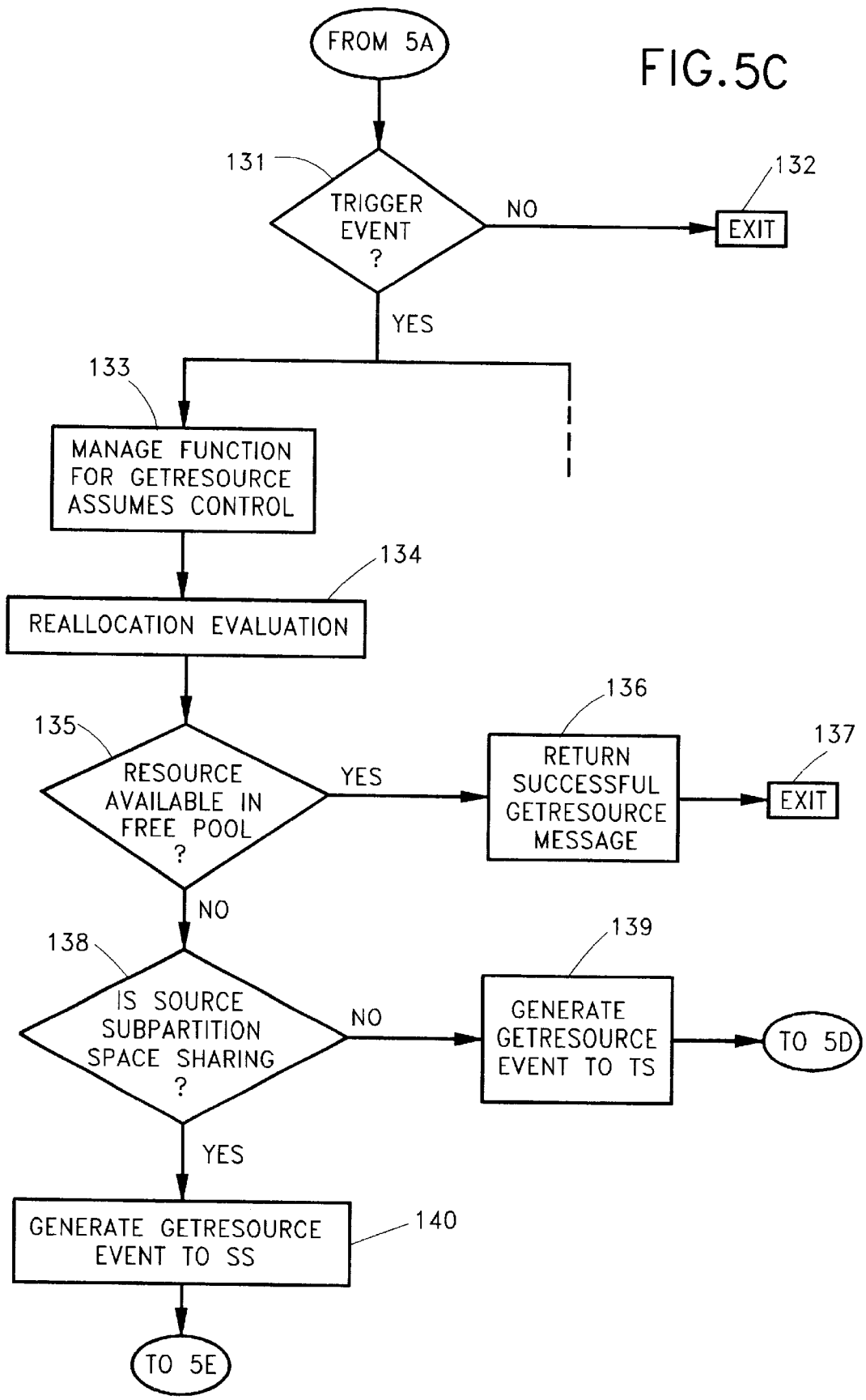

FIG. 5C depicts the process flow which may be undertaken at a gang scheduling partition, 42 of FIG. 4, having both time and space sharing subpartitions within its control. The gang scheduling partition determines if a detected event is a triggering event at step 131. If no triggering event is detected, the system exits at step 132. If, however, a triggering event is detected, the gang scheduling partition invokes the appropriate function to apply FDP. As shown in steps 133 through 140, the gang scheduling partition may be called upon to respond to a "getResource" command trigger sent from the top level partition. If so, the first step is to invoke the gang scheduling manage function at step 133.

Next, at 134, a reallocation evaluation is conducted, applying such criteria as the size of the pool of free resources and a determination as to which subpartition may be able to free up resources. If a determination is made at step 135 that there are sufficient resources in the free pool to satisfy the request, then the gang scheduling partition returns a message to the top level partition that the reallocation is successful, at 136, and exits at 137, as above. If there are not sufficient resources in the free pool, a "no" determination at step 135, then another decision is made at step 138 as to whether the associated space sharing subpartition is able to give up some resources to satisfy the request. If the answer is "yes", the gang scheduling partition generates a "getResource" command at 140 to its space sharing subpartition for it to perform FDP, as detailed in FIG. 5E.

If the associated space sharing subpartition cannot give up the resources, the gang scheduling partition will issue a "getResource" command to the associated time sharing subpartition at 139 for it to perform FDP, as detailed in FIG. 5D. In FIG. 5D the time sharing subpartition, 47 of FIG. 4, ascertains whether it has detected an event which is an FDP triggering event, at step 141. If the event is not a trigger, it exits at 142. If the event is a trigger, the subpartition invokes the appropriate manage function, as shown at 143 and 147. At 143, the manage function is invoked for the "getResource" function, and a reallocation evaluation is conducted at 144, including at least a determination of which subpartition can give up resources to fulfill the request. Since the scheduling is time sharing, the manage function sets its schedule up for release of resources when all applications in the subpartition terminate, at step 145, and then exits at 146. Application termination is an example condition for a partition to release resources. Resources can also be released if the system has facilities to vacate the applications (e.g., application checkpointing).

The process flow is depicted at 147 to 152 for the time sharing subpartition to respond to a trigger requiring the subpartition to terminate all applications. After the manage function is invoked at 147, the determination is made as to whether there is any task waiting for resources at 148. If no task is waiting, any released resources are returned to the free pool at 149 and the system exits at 150. If there is one or more task waiting, the subpartition returns a message that the reallocation is successful, at 151, and exits at 152.

Lastly, FIG. 5E shows two representative process flows which can be conducted at a space sharing subpartition upon a determination at 160 that a triggering event has occurred. If the space sharing subpartition is responding to a "getResource" command, the appropriate manage function is invoked at 162 and a reallocation evaluation undertaken at 163. The reallocation evaluation for the space sharing subpartition involves a determination as to which of its subpartitions can give up resources. The space sharing subpartition communicates with the application level manager at 164 regarding reconfiguration to release resources. Assuming that the application is reconfigurable, the space sharing subpartition provides that resources will be released once reconfiguration is done, at step 165, and exits at step 166.

In response to a reconfiguration completion, the space sharing subpartition will invoke the appropriate manage function at 167 and determine whether there is a task waiting for any released resources at 168. If no task is waiting, any released resources are returned to the free pool at 169 and the system exits at 170. If there is one or more task waiting, the subpartition returns a message that the reallocation is successful, at 171, and exits at 172.

Detected faults in resources allocated to a partition can be one of the system triggers for FDP. The reallocation functions for fault detection can be tailored to the fault tolerant characteristics of applications. For partitions running applications that are not written to be fault-tolerant, a partial failure of their allocated resources will trigger reallocation of all non-faulty resources. On the other hand, the reallocation function for partitions running with fault-tolerant applications may do nothing with the non-faulty resources.

Figure 6:
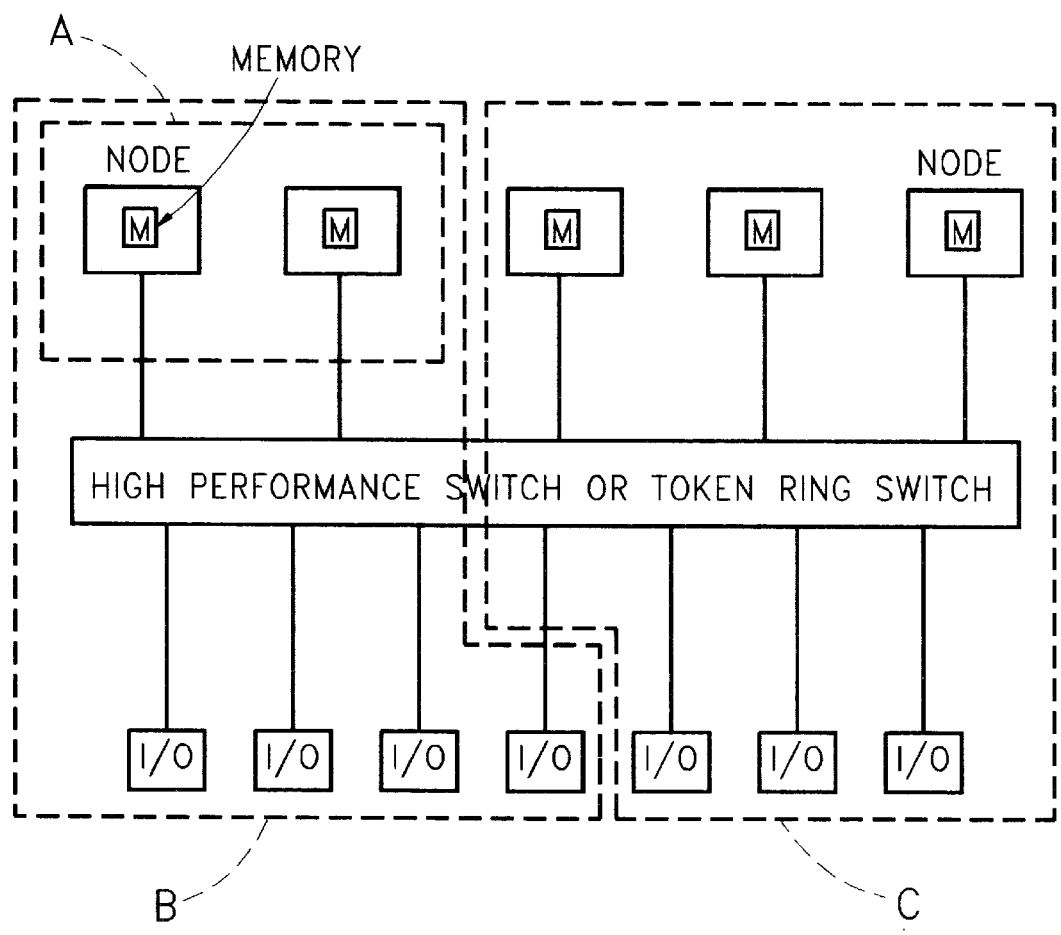
FIG. 6 provides a schematic diagram of implementation of the invention on an IBM SP2 system.

IBM SP/2 system is a system with full connectivity of multiple independent nodes and devices via a high performance switch or token ring. This system platform is an ideal environment to apply the means and methods of FDP to partition the system in support of various resource scheduling requirements, as illustrated in FIG. 6. Block A is an example of partitioning the system by memory sizes. The addition/removal of nodes in such partition requires defining memory size as a constraint in the reallocation function. Similarly, the dynamic partitioning of resource in Block B and C would involve the I/O devices and nodes as the resources in the reallocation functions while the utilization of the nodes and I/O devices would be the triggers that will set off the reallocation functions. The invention provides a dynamic reallocation methodology for distributed computing environments which previously did not exist.

The implementation of FDP may be carried out using any prevailing computer software techniques. However, it has been one of the objects of the present invention to use the object-oriented framework to implement FDP. The object-oriented framework for FDP defines sets of classes and their interactions. In our preferred embodiment herein, the process flow of FIG. 1 can be implemented through the object-oriented method calls of event-handler, manage-resource, get-resource and give-resource. The event-handler method receives the event and verifies its status in order to trigger resource reallocation. The manage-resource method uses the appropriate user/system information and determines which partitions and resources should be part of the reallocation. The get-resource method will set the actions for obtaining the requested resources from a partition, while the give-resource method will grant them to the partition in need. These methods are designed with considerable generality, allowing implementation to specialized partitions in any hierarchy as a matter of customizing the method calls, as is advantageous in operating in an object-oriented framework. While implemented in an object-oriented framework, the methodology may also be implemented in other frameworks without departing from the invention.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for providing resource allocation among partitions in a partitioned multi-node computing environment comprising a plurality of partitions each applying its own scheduling methodology, comprising the steps of:

dynamically detecting at least one event which may require reallocation of resources;

determining if said at least one event necessitates reallocation of resources among said partitions;

conducting reallocation evaluation to determine if reallocation is appropriate based on system reallocation criteria; and if reallocation is appropriate, conducting resource reallocation by instructing at least one of said plurality of partitions to perform evaluating of resource availability across its partition according to its scheduling methodology and to release at least one available resource; and allocating said at least one released resource to at least one other of said plurality of partitions.

2. The method of claim 1 wherein said detecting step comprises perceiving the occurrence of a system event; and wherein said determining step comprises determining that said system event comprises a user-defined system event necessitating reallocation of resources to at least one partition.

3. The method of claim 1 wherein said detecting step comprises perceiving the occurrence of an application event; and wherein said determining step comprises determining that said application event comprises a user-defined application event necessitating reallocation of resources to at least one partition.

4. The method of claim 1, wherein said multi-node environment comprises a hierarchical arrangement having at least one top level partition and more than one lower level partitions under said top level partition, and wherein said conducting resource allocation comprises said top level partition instructing one of said more than one lower level partitions to conduct resource allocation at lower level and wherein said allocating is performed at said lower level.

5. The method of claim 4, wherein, in response to said instructing, said one of said more than one lower level partitions evaluates resource availability across nodes of said lower level partition; accesses at least one available node based upon said evaluating; and allocates said at least one available node to said at least one partition.

6. The method of claim 5 wherein each of said more than one lower level partitions is adapted for resource scheduling utilizing its own scheduling methodology and wherein said one of said more than one lower level partitions allocates in accordance with its scheduling methodology.

7. The method of claim 5 further comprising the step of queuing said reallocation based upon said evaluating, until at least one resource becomes available.

8. The method of claim 6 further comprising the step of said top level selecting one of said lower level partitions based upon its scheduling methodology.

9. The method of claim 1 wherein said conducting reallocation evaluation comprises determining elapsed time between a previous reallocation and said event detection and queuing said reallocation until said elapsed time matches a threshold time.

10. A system for providing optimal utilization of computer resources among multiple tasks in a multi-node computing environment comprising:

a plurality of computer resources;

a plurality of computer nodes connected to each other and to said resources, said computer nodes being grouped into more than one partition, each scheduling according to its own scheduling methodology;

at least one control entity for each of said more than one partition, said control entity being adapted to detect events requiring reallocation of resources among said more than one partitions; evaluate resource availability across nodes of said partition; access at least one available node based upon said evaluating; and allocate said at least one available node to one of said more than one partition.

11. The system of claim 10 wherein said computer nodes are grouped into at least one top level partition and more than one lower level partitions under said top level partition.

12. The system of claim 11 wherein said computer nodes are further grouped into a plurality of successively smaller lower level partitions with the smallest lower level partitions comprising single node partitions.

13. The system of claim 11 wherein said control entity of each of said more than one lower level partitions is adapted to provide resource scheduling according to a different scheduling methodology.

14. The system of claim 12 wherein said control entity of each of said plurality of successively smaller lower level partitions is adapted to provide resource scheduling according to a different scheduling methodology.

15. The system of claim 10 further comprising at least one system administrator for establishing standards for events requiring reallocation, as applied in said evaluating.

16. The system of claim 10 wherein said control entity further comprises clock means for determining elapsed time between successive reallocations and means for comparing said elapsed time to a preset threshold.

17. The system of claim 16 wherein said control entity further comprises means for temporarily storing event information until said means for determining determines that said elapsed time exceeds said preset threshold.

18. The system of claim 10 wherein said control entity further comprises means for temporarily storing event information until said evaluating step locates available resources.

19. The system of claim 10 wherein said multi-node environment comprises, an object-oriented framework.

20. The method of claim 1 wherein said conducting reallocation evaluation comprises determining the number of waiting applications and queuing said reallocation until said number reaches a preset threshold.

* * * * *